US008627007B1

United States Patent
Huang et al.

(10) Patent No.: US 8,627,007 B1
(45) Date of Patent: Jan. 7, 2014

(54) USE OF CACHE TO REDUCE MEMORY BANDWIDTH PRESSURE WITH PROCESSING PIPELINE

(75) Inventors: Jianhui Huang, Fremont, CA (US); Sharada Yeluri, San Jose, CA (US); Jean-Marc Frailong, Los Altos, CA (US); Jeffrey G. Libby, Cupertino, CA (US); Anurag P. Gupta, Saratoga, CA (US); Paul Coelho, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 662 days.

(21) Appl. No.: 12/607,510

(22) Filed: Oct. 28, 2009

(51) Int. Cl.
*G06F 12/00* (2006.01)

(52) U.S. Cl.
USPC ........... 711/118; 711/158; 711/151; 711/154; 711/167; 711/169

(58) Field of Classification Search
None
See application file for complete search history.

(56) References Cited

U.S. PATENT DOCUMENTS

| | | | | |
|---|---|---|---|---|
| 6,148,381 | A * | 11/2000 | Jotwani | 711/158 |
| 2004/0107220 | A1 * | 6/2004 | Natesan et al. | 707/104.1 |
| 2009/0182940 | A1 * | 7/2009 | Matsuda et al. | 711/114 |

* cited by examiner

*Primary Examiner* — Christian Chace
*Assistant Examiner* — Alan Otto
(74) *Attorney, Agent, or Firm* — Harrity & Harrity, LLP

(57) ABSTRACT

A data read/write system includes a system clock, a single port memory, a cache memory that is separate from the single port memory, and a controller coupled to an instruction pipeline. The controller receives, via the instruction pipeline, first data to write to an address of the single port memory, and further receives, via the instruction pipeline, a request to read second data from the single port memory. The controller stores the first data in the cache memory, and retrieves the second data from either the cache memory or the single port memory during one or more first clock cycles of the system clock. The controller copies the first data from the cache memory and stores the first data at the address in the single port memory during a second clock cycle of the system clock that is different than the one or more first clock cycles.

20 Claims, 14 Drawing Sheets

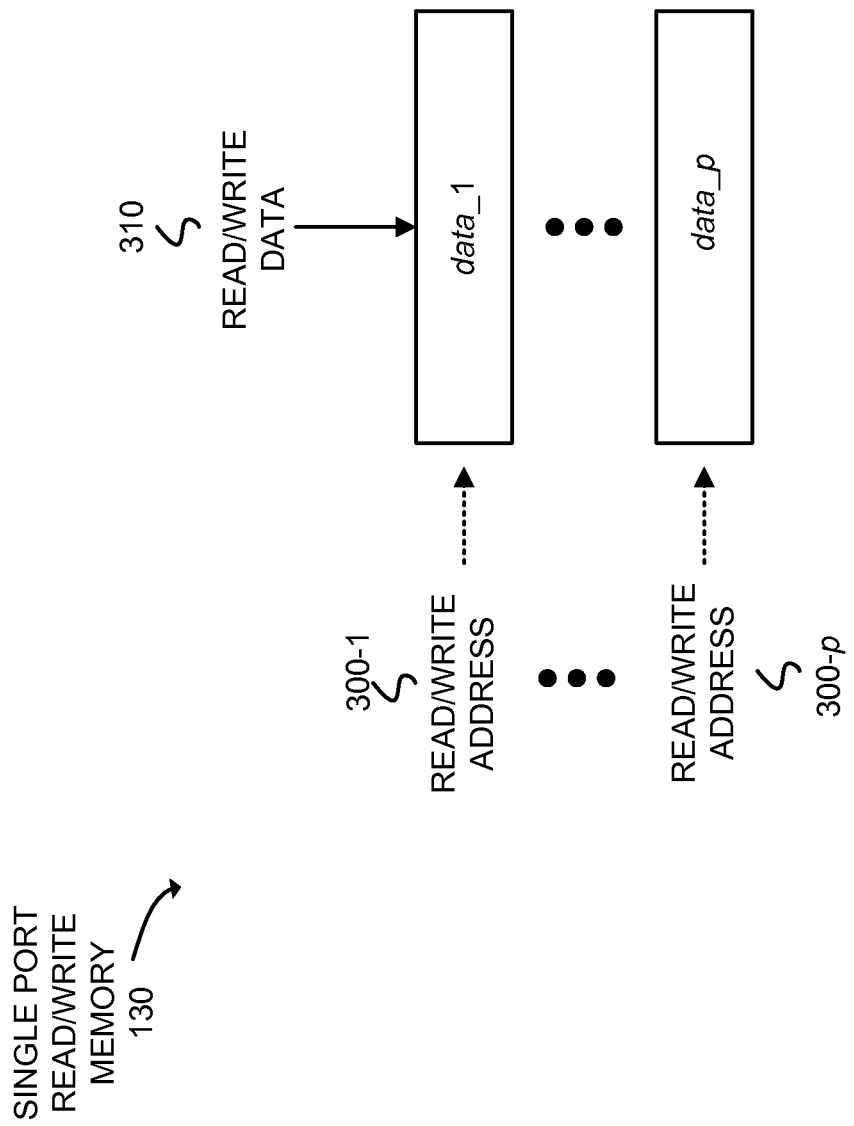

USE OF CACHE TO REDUCE MEMORY BANDWIDTH PRESSURE WITH PROCESSING PIPELINE

BACKGROUND

Various types of memory devices may be used, for example, in network devices, including routers, bridges, switches, etc. Such memory devices may be used for storing various data associated with the operation of the network devices, including packet storage, context storage, lookup table storage, etc. One type of memory device that may be used in a network device is a single port Random Access Memory (RAM). A single port RAM may be accessed at one memory address at one time and, therefore, only one memory cell may be read from, or written to, during each clock cycle. Another type of memory device that may be used in a network device is a dual port RAM that can read and write different memory cells at different addresses during each clock cycle. A single port RAM, however, is smaller and consumes less power than a dual port RAM, or some other types of memory devices.

SUMMARY

In accordance with one embodiment, a method implemented in a data read/write system that includes a single port memory may include receiving, at a controller of the data read/write system, first data to write to an address of the single port memory, and receiving, at the controller, a request to read second data from the single port memory. The method may further include storing the first data in a cache memory that is separate from the single port memory and retrieving the second data from either the cache memory or the single port memory during a first system clock cycle. The method may also include copying the first data from the cache memory and storing the first data at the address in the single port memory during a second system clock cycle that is different than the first clock cycle.

In another embodiment, a method may include receiving read requests for reading data from a single port memory and receiving write requests for writing data to the single port memory. The method may further include temporarily storing data associated with the write requests to a cache memory that is external to the single port memory, and assigning a first priority to at least a portion of the read requests and a second priority to the write requests, where the first priority is higher than the second priority. The method may also include accessing the single port memory to read the first data from the single port memory, or to write the second data from storage in the cache memory to the single port memory, based on the assigned first and second priorities.

In still another embodiment, a method implemented in a data storage system may include receiving, at a controller of the data storage system, data to store at an address of a single port memory and storing the data, at a first system clock cycle, in a cache memory of the data storage system that is separate from the single port memory. The method may further include copying the data from the cache memory, at a second system clock cycle, and storing the data at the address in the single port memory and receiving, at the controller, a request to read the data from the single port memory. The method may also include determining, by the controller, if the data remains stored in the cache memory. The method may additionally include retrieving the data from the cache memory, and not from the single port memory, if the data remains stored in the cache memory, and retrieving the data from the address in the single port memory if the data is no longer stored in the cache memory. The method may also include returning the retrieved data in response to the data read request.

BRIEF DESCRIPTION OF THE DRAWINGS

The accompanying drawings, which are incorporated in and constitute a part of this specification, illustrate one or more embodiments described herein and, together with the description, explain the invention. In the drawings.

FIG. 3 is an exemplary diagram of the single port read/write memory of FIG. 2;

DETAILED DESCRIPTION

The following detailed description refers to the accompanying drawings. The same reference numbers may be used in different drawings to identify the same or similar elements. Also, the following detailed description does not limit the invention. Instead, the scope of the invention is defined by the appended claims and equivalents.

Exemplary embodiments described herein implement a data reading/writing system for reading data from, and/or writing data to, a single port memory. The exemplary embodiments use a separate cache memory to reduce memory bandwidth pressure by delaying data writes to the single port memory. By using a separate cache memory, the single port memory may be used in the data read/write system as opposed to, for example, using a dual port memory. Use of the separate cache memory in conjunction with the single port memory reduces the physical space and power required by the overall read/write system.

The separate cache memory may be used, as described herein, to temporarily store data being written to, or being read from, the single port memory. A cache controller may control the reading of data to, and data from, the cache memory according to a priority mechanism in which reads and writes have different priorities for accessing the single port memory. According to exemplary embodiments described herein, requests to read data from the single port memory, when the requested data is not stored in the cache memory, receive a higher priority than requests to write data to the single port memory. Write data, after being temporarily stored in the cache memory, may be "written back" to the single port memory during clock cycles in which no read requests are pending. The separate cache memory described herein additionally permits per-bit data writing in which each item of data stored in the cache may be written per bit into the cache memory (i.e., as opposed to writing the entirety of one or more memory words into the cache memory).

Exemplary Data Read/Write System

Figure 1:
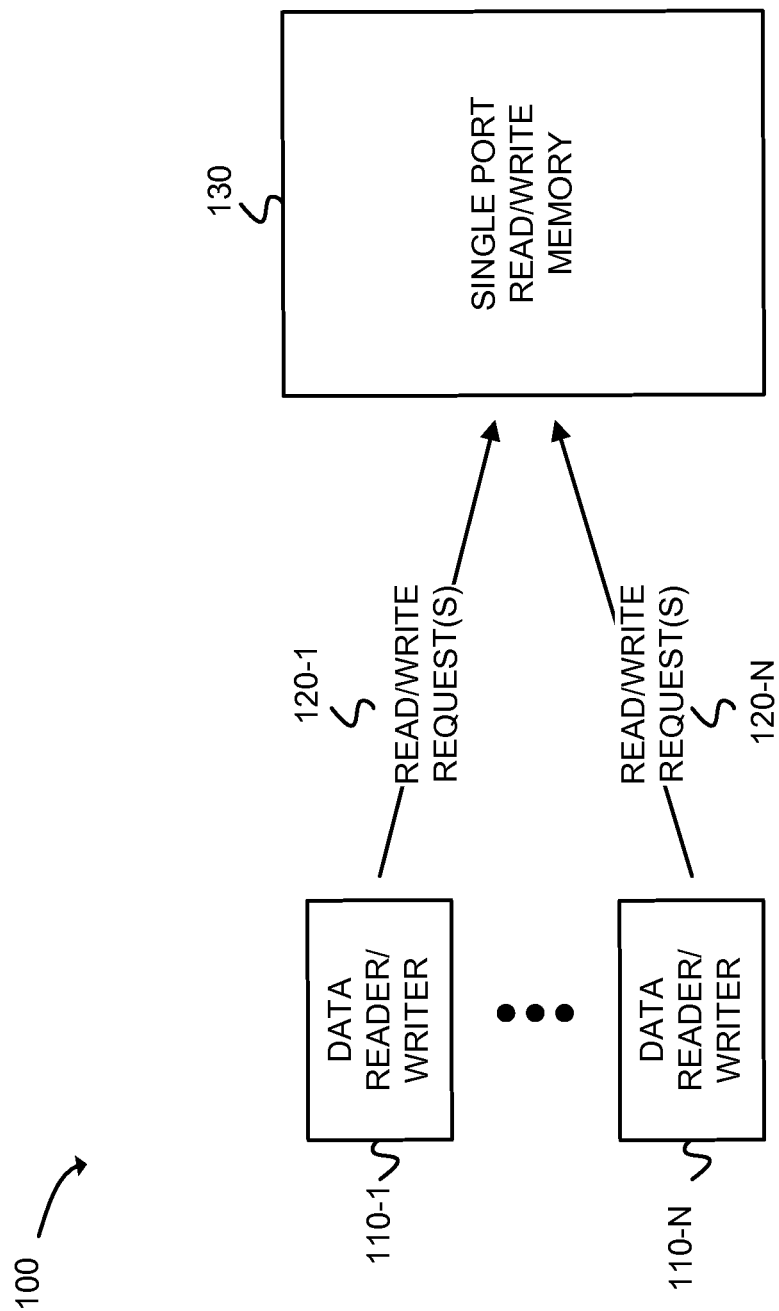
FIG. 1 is a diagram of an exemplary system in which multiple data readers/writers may send read/write requests to a single port read/write memory.

FIG. 1 is a diagram of a data read/write system 100 according to an exemplary embodiment. System 100 may include multiple data readers/writers 110-1 through 110-N (generically referred to herein as "data reader/writer 110") which may send respective read/write requests 120-1 through 120-N to a single port read/write memory 130. Each of data readers/writers 110-1 through 110-N may, in some embodiments, include a separate "thread" that sends respective read/write requests 120 to memory 130. As a single port memory, memory 130 may only be accessed one memory address at a time during each clock cycle. Memory 130 may include, for example, a single port Random Access Memory (RAM).

In one exemplary embodiment, data readers/writers 110-1 through 110-N may reside in an instruction processing pipeline (not shown). The instruction processing pipeline may include, for example, a barrel pipeline. Each of read/write requests 120-1 through 120-N may include one or more requests to read data from memory 130, or to write data to memory 130.

Figure 2:
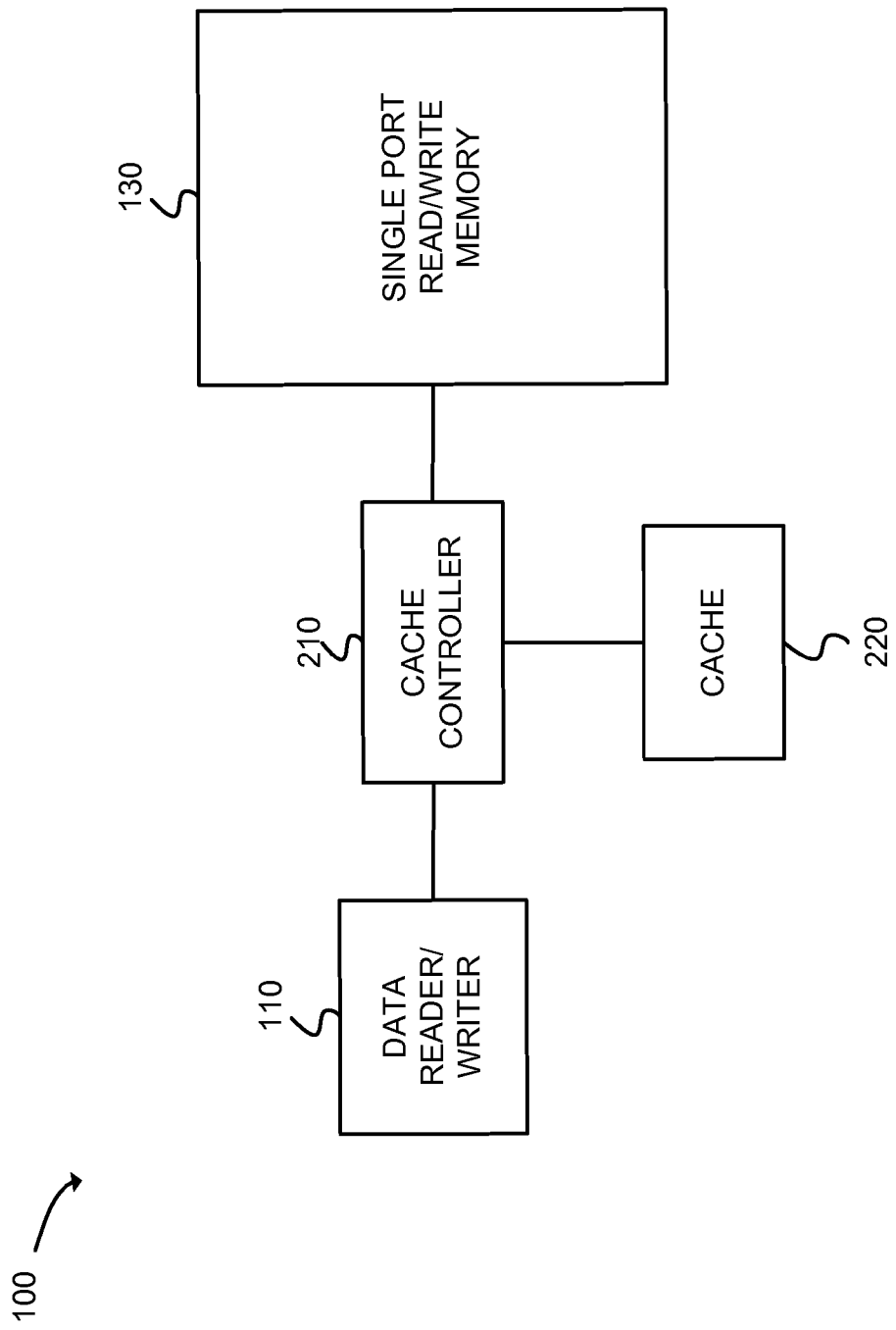
FIG. 2 is a diagram that illustrates further details of the exemplary system of FIG. 1.

FIG. 2 illustrates further details of the exemplary system 100 of FIG. 1. As shown in FIG. 2, which depicts a single data reader/writer 110 for purposes of simplicity, cache controller 210 may be located between data reader/writer 110 and single port memory 130 to intercept read/write requests from data reader/writer 110. A cache memory 220, that may be separate from, and external to, single port memory 130, may additionally connect to cache controller 210. Cache controller 210 may include any type of processing logic, such as, for example, hardware logic, or a combination of software and hardware logic, which may operate to control the reading and writing of data from/to cache memory 220 and single port memory 130.

Cache memory 220 may store data associated with read and write requests received by cache controller 210. Cache memory 220 may store the data based on control signals received from cache controller 210. Given that memory 130 includes a single port memory that permits only one read or write to a memory address per clock cycle, cache controller 210, in conjunction with cache memory 220, serves to reduce memory bandwidth pressure by prioritizing and scheduling read and write requests received from data reader/writer 110.

Data read from memory 130 may be stored in cache memory 220 in conjunction with being returned to data reader/writer 110. Data to be written to memory 130 may initially be stored in cache memory 220 prior to being "written back" to memory 130 using opportunistic or forced "writeback" techniques (described further below). Read and write requests may be given different levels of priority by cache controller 210. For example, when read requests from data reader/writer 110 find no corresponding data in cache memory 220, causing read requests to memory 130, the read requests may be given priority over all writebacks to memory 130. Write requests may be given two different priorities, depending on whether the data is being "written back" to memory 130 using forced, or opportunistic, writeback techniques. In forced "writeback," an entry stored in cache memory 220, that has not yet been written back to memory 130 (i.e., the data is marked as "dirty" in cache memory 220), may be written back to memory 130 during any clock cycle in which no read requests are pending and prior to any opportunistic writebacks. In opportunistic "writeback," an entry stored in cache memory 220, which has not yet been written back to memory 130, may be written to memory 130 during any clock cycle in which no read requests are pending, but subsequent to any forced "writebacks." Therefore, cache controller 210 may prioritize read/write access to single port memory 130 via three different priorities: 1) read requests receive the highest priority; 2) forced writebacks receive the second highest priority; and 3) opportunistic writebacks receive the lowest priority.

A system clock (not shown in FIG. 2) may further be associated with system 100. The system clock may provide timing cycles to the components of system 100 to control the timing of logic execution by the various components (e.g., control when data is written to cache memory 220 or memory 130, or read from cache memory 220 or memory 130). The timing cycles may include, for example, a train of high and low signals.

The number of components of system 100 depicted in FIG. 2 is exemplary. Fewer, more, or different components may be included in system 100. Additionally, the tasks described herein as being executed by specific components of system 100 may, in other embodiments, be executed by different components.

Exemplary Single Port Read/Write Memory

FIG. 3 is a diagram of single port read/write memory 130 according to an exemplary embodiment. Memory 130 may include read/write data 310 that may be stored in respective read/write addresses 300-1 through 300-p in memory 130. Each item of data stored in read/write data 310 may include data that has been written to a respective read/write address 300, and which may be subsequently read from the respective read/write address 300.

Exemplary Cache Memory

Figure 4A:
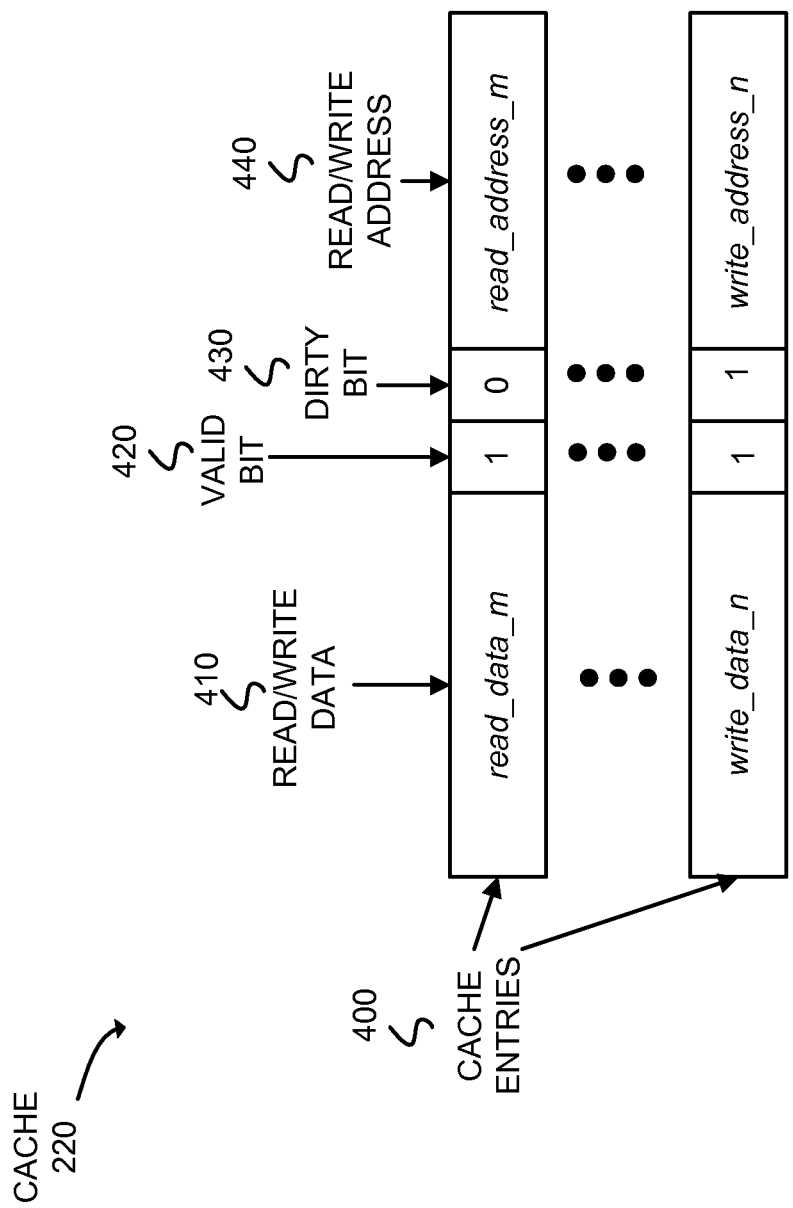
FIG. 4A is an exemplary diagram of the cache memory of FIG. 2.

FIG. 4A is a diagram of cache memory 220 according to an exemplary embodiment. Cache memory 220 may include multiple cache entries 400, each of which may include a read/write data field 410, a "valid" bit field 420, a "dirty" bit field 430, and a read/write address field 440. Cache memory 220 may include additional or different fields than those depicted in FIG. 4A. FIG. 4A depicts a number of cache entries 400 for data associated with read/write requests from a single data reader/writer 110. Therefore, each one of data readers/writers 110-1 through 110-N, which sends a read or write request to cache controller 210, may have a section of entries 400 in cache memory 220. The number of entries 400 in cache memory 220 may be selectively limited by cache controller 210 (e.g., four entries 400 per data reader/writer 110). Cache memory 220, therefore, may be partitioned on a per-data reader/writer basis (i.e., cache memory 220 may be partitioned into groups of entries 400, with each group being assigned to a data reader/writer that sends a read or write request to cache controller 210).

Read/write data field 410 may store data that has been read from memory 130, or which is going to be written to memory 130. Valid bit field 420 may store a single bit that indicates whether or not the data stored in read/write data field 410 is valid for use. If, for example, valid bit field 420 is set to zero, then any data stored in read/write data field 410 may be considered invalid, and may be ignored by cache controller 210 (i.e., can be written over with new data). Dirty bit field 430 may store a single bit that indicates whether the data stored in read/write data field 410 needs to be written back to memory 120 subsequent to being stored in cache memory 220. If, for example, dirty bit field 430 is set to one, then the data stored in read/write data field 410 has not yet been written back from cache memory 220 to memory 130 (i.e., data is "dirty"). If dirty bit field 430 is set to zero, then the data stored in read/write data field 410 has been written back from cache memory 220 to memory 130 (i.e., data is "clean"). Read/write address field 440 may specify the memory address in memory 130 to which the data stored in read/write data field 410 is to be written, or may specify the memory address in memory 130 from which the data stored in read/write data field 410 was read.

Exemplary Per-Bit Cache Writing

Figure 4B:
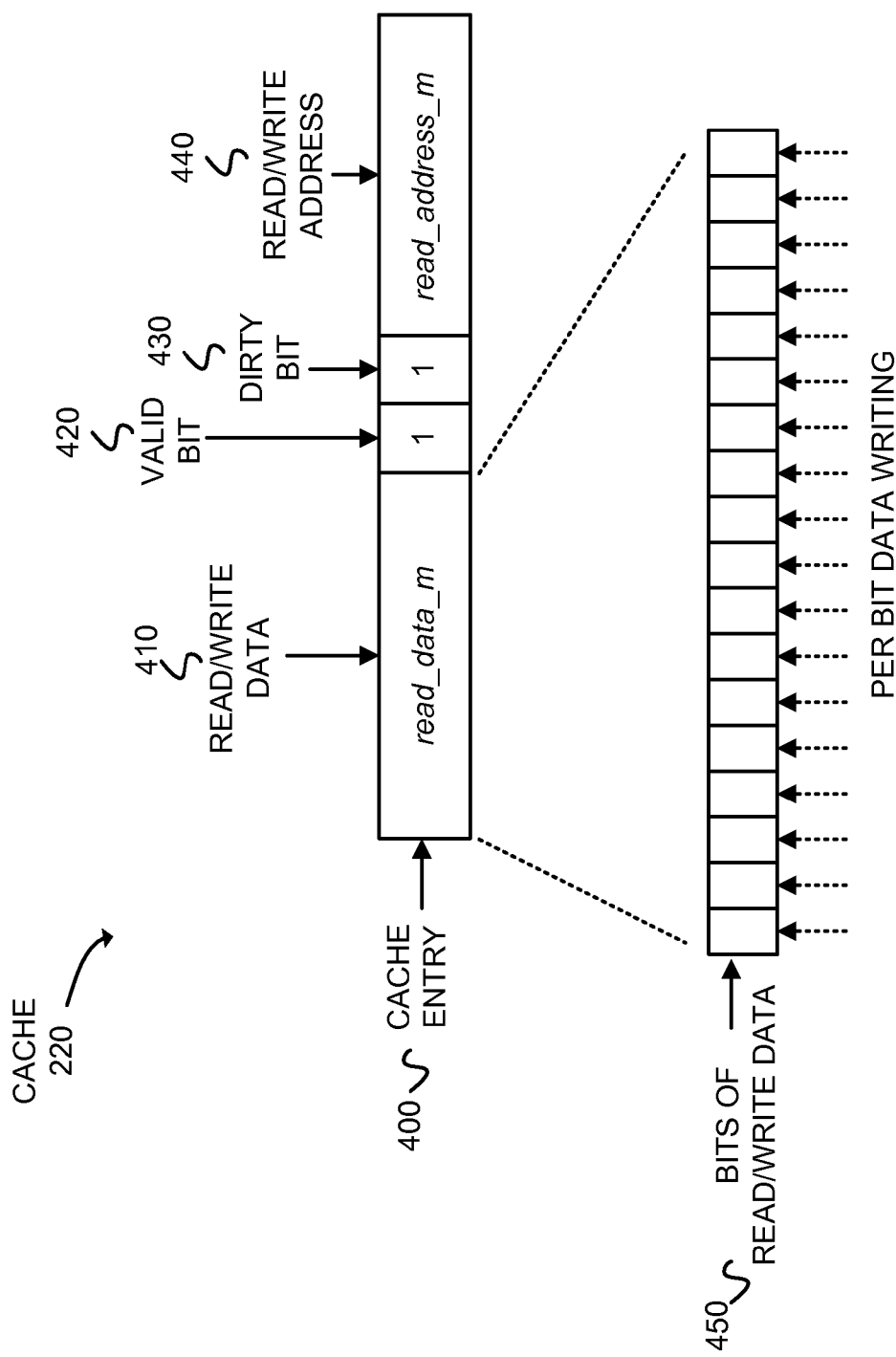
FIG. 4B is an exemplary diagram of per-bit data writing that may occur in the cache memory of FIG. 2.

FIG. 4B is a diagram that illustrates exemplary per-bit writing of data to cache memory 220. The data stored in read/write data field 410 of may include multiple memory words. Cache controller 210 may permit data reader/writer 110 to write to individual bits within the multiple memory words in read/write data field 410. As shown in FIG. 4B, each read/write data field 410 may include multiple bits 450 of read/write data. Via per-bit write enables, cache controller 210 may write individual bits of data to read/write data field 410 based on write requests received from data reader/writer 110. Write requests received from data reader/writer 110 may, therefore, write to only selected bits of read/write data field 410 in cache memory 220. The use of per-bit writing requires that the data for the address to be written to be present in cache memory 220 at the time that the write request is processed.

Exemplary Read/Write Request Handling Process

Figure 5:
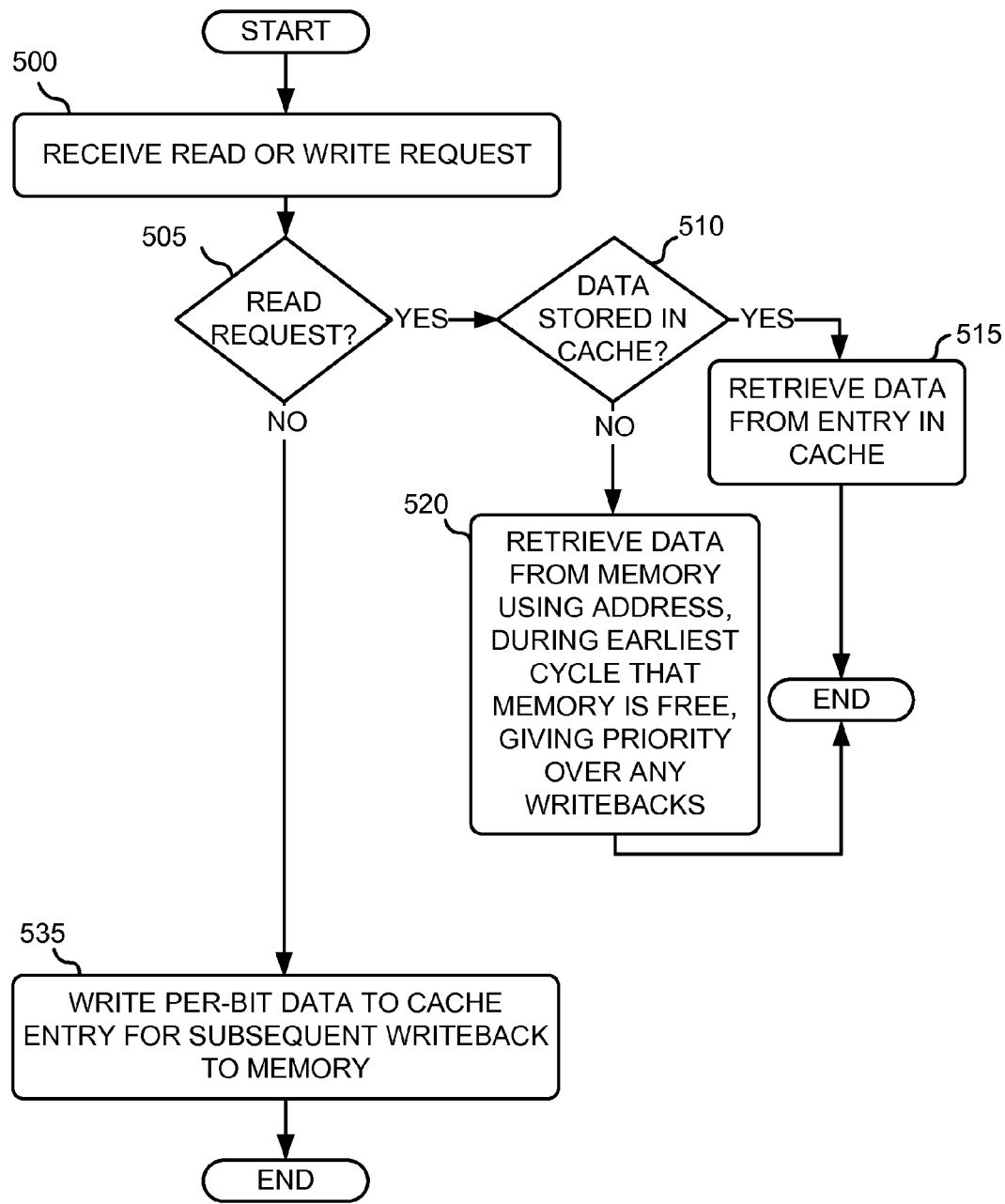
FIG. 5 is a flow chart that illustrates an exemplary process for handling read or write requests received from the data reader/writer of FIG. 2.

FIG. 5 is a flow chart that illustrates an exemplary process for handling read or write requests received from data reader/writer 110. The exemplary process of FIG. 5 may be performed by cache controller 210. In other embodiments, some or all of the blocks described below may be performed by another component or device, or a combination of components or devices.

The exemplary process may include receiving a read or write request (block 500). Cache controller 210 may receive a read or write request from data reader/writer 110. The read request may include the address in memory 130 from which data is to be read. The write request may include the data to be written into memory 130, and the address in memory 130 into which the data is to be written.

It may be determined whether the received request is a read request (block 505). Cache controller 210 may analyze the received read or write request to identify if it is a read request. If the received request is a read request (block 505—YES), then it may be determined if the requested data is stored in cache memory 220 (block 510). Upon determining that the received request is a read request, cache controller 210 may search through each read/write address field 440 of cache entries 400 to identify a read/write address stored in field 440 that matches the read address contained in the read request. If there are no matches between the read address contained in the read request, and the contents of read/write address field 440 of entries 400 of cache memory 220, then cache controller 210 may determine that the requested data is not stored in cache memory 220. If a match is found between the read address contained in the read request, and the contents of a read/write address field 440 of an entry 400 of cache memory 220, then cache controller 210 may determine that the requested data is stored in cache memory 220.

Figure 6A:
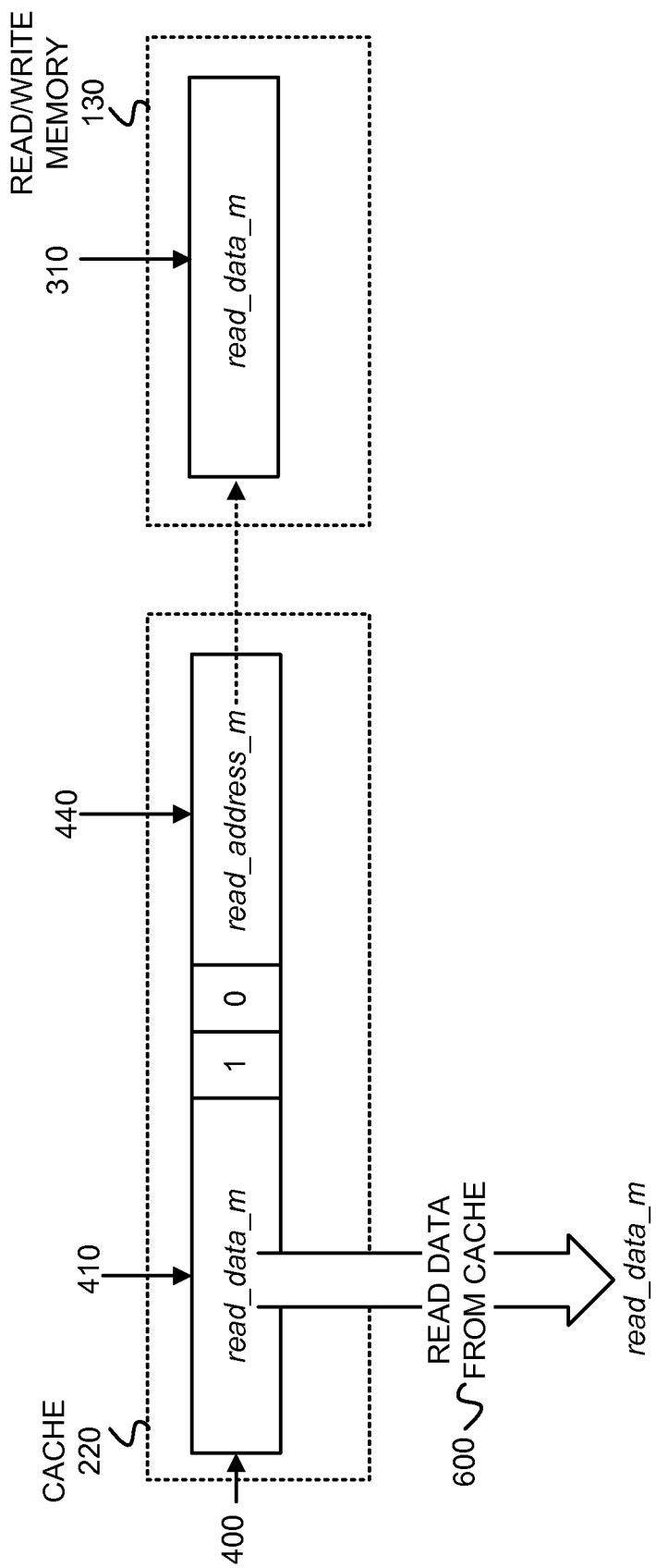
FIG. 6A is a diagram that depicts an example of reading data from the cache memory of FIG. 2.

If the requested data is stored in cache memory 220 (block 510—YES), then the requested data may be retrieved from the corresponding entry in cache memory 220 (block 515). Cache controller 210 may retrieve data from read/write data field 410 of the cache entry identified in block 510. The data retrieved from cache memory 220 may be subsequently returned to data reader/writer 110 that requested the data read operation. FIG. 6A depicts an example of retrieval of read data from cache memory 220. As shown in FIG. 6A, an identification of an entry 400 whose memory address 440 (read_address_m shown in FIG. 6A) matches the address contained in the read request permits cache controller 210 (not shown in FIG. 6A) to read 600 the data from read/write data field 410 of entry 410 of cache memory 220. Retrieval of read data from cache memory 220 saves power as opposed to having to read the data from read/write data 310 of memory 130. The data retrieved from cache memory 220 may be returned to the requesting data reader/writer 110.

Figure 6B:
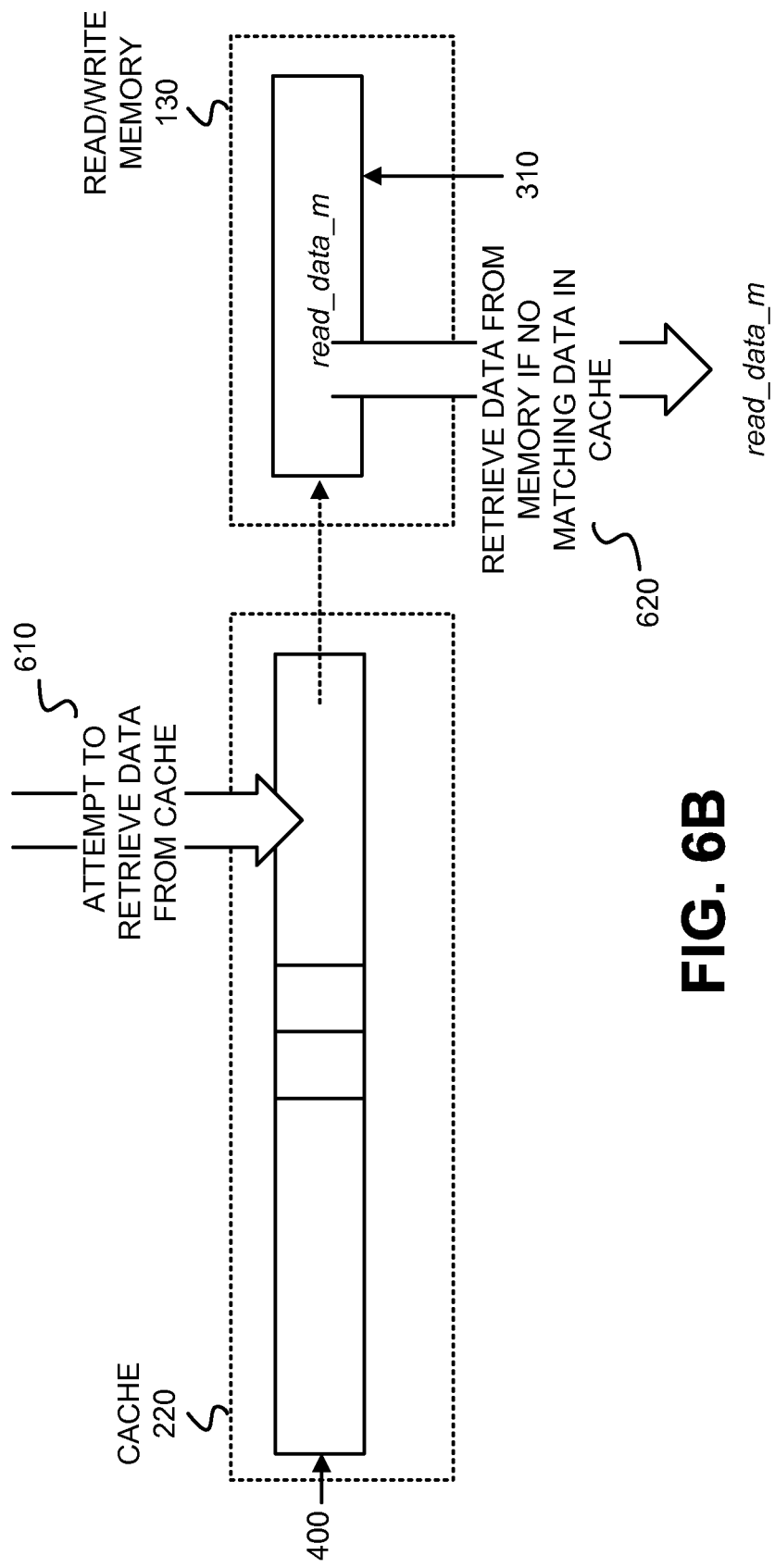
FIG. 6B is a diagram that depicts an example of reading data from the single port memory of FIG. 2.

If the requested data is not stored in cache memory 220 (block 510—NO), then the requested data may be retrieved from memory 130, using the memory address contained in the read request, during the earliest clock cycle that memory 130 is free, giving priority to the memory read over any writebacks (block 520). Memory 130 is free when no other memory reads have been previously scheduled for execution. The memory read being performed in block 520 may be performed prior to any other pending data writebacks from cache memory 220 to memory 130. FIG. 6B depicts an example of retrieval of read data from memory 130. As shown in FIG. 6B, an attempt 610 to retrieve data from cache memory 220 may fail (i.e., the requested read data is not stored in cache memory 220) and may then result in retrieval 620 of the requested data from read/write data 310 of memory 130. The data retrieved from memory 130 may be returned to the requesting data reader/writer 110, in addition to being stored (i.e., similar to a read request) in an entry 400 of cache memory 220.

Returning to block 505, if it is determined that the received request is not a read request (i.e., it is a write request), then per-bit data may be written to cache memory 220 for subsequent writeback to memory (as described below with respect to FIG. 8), and the exemplary process of FIG. 5 may end. Cache controller 210 may analyze the received request to identify that the request is a write request. Data may be written to cache memory 220 per-bit, as described above with respect to FIG. 4A. Once the per-bit data has been written to cache memory 220, subsequent writeback of the data from cache memory 220 to memory 130 may occur at a clock cycle that is subsequent to a current clock cycle (i.e., a delay occurs between storing the data in cache memory 220, and writing the data back to memory 130 from cache memory 220).

The exemplary process of FIG. 5 may be selectively repeated by cache controller 210 for each read or write request received from data reader/writer 110.

Exemplary Read/Write Request Blocking Process

Figure 7:
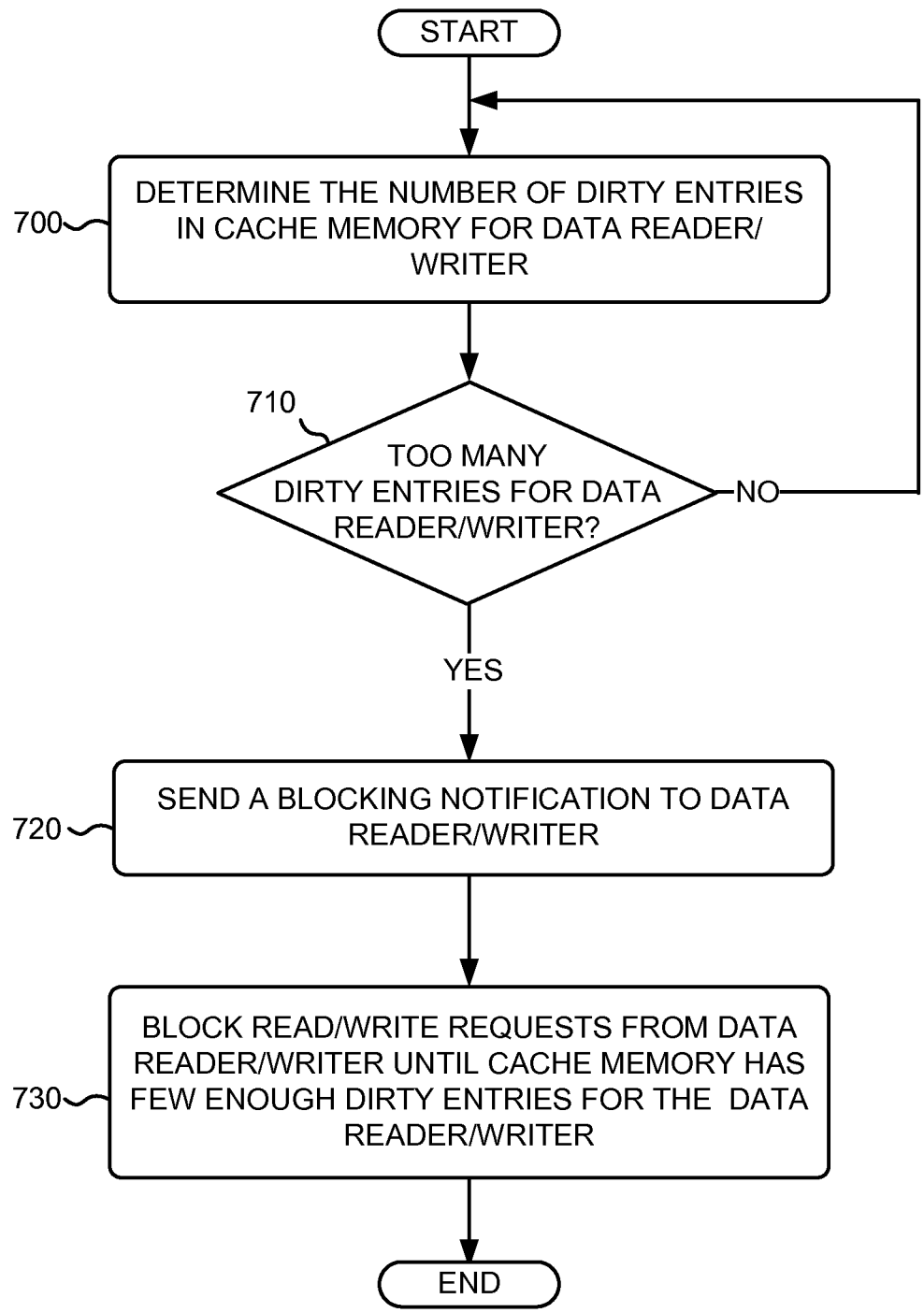
FIG. 7 is a flow chart that illustrates an exemplary process for blocking read/write requests from data readers/writers of FIG. 1.

FIG. 7 is a flow chart that illustrates an exemplary process for blocking read/write requests from data readers/writers 110. The exemplary process of FIG. 7 may be performed by cache controller 210. In other embodiments, some or all of the blocks described below may be performed by another component or device, or a combination of components or devices. The exemplary process of FIG. 7 may be performed for each one of data readers/writers 110-1 through 110-N that has data stored in cache memory 220. Therefore, since cache memory 220 may be partitioned on a per-data reader/writer basis, as described above, a determination of a number of dirty entries in cache memory 220 (described below with respect to blocks 700 and 710) may be performed separately for each data reader/writer's entries in cache memory 220.

The exemplary process may include determining the number of dirty entries in cache memory 220 for a given data reader/writer 110 (block 700). Though not shown in FIG. 4A, cache entries 400 may be grouped together for each data reader/writer 110 that has data stored in cache memory 220. For example, data reader/writer 110-1 may be associated with a first group of cache entries 400, and data reader/writer 110-N may be associated with a second, different group of cache entries 400. The entries for each groups of cache entries associated with a given data reader/writer 110 may be contiguous in cache memory 220 (i.e., partitioned together).

If there are not too many dirty entries in cache memory 220 (block 710—NO), then the exemplary process may return to block 700 (i.e., a continuous loop that keeps track of whether a data reader/writer has too many dirty entries stored in cache memory 220). Cache controller 210 may determine that a threshold number of dirty entries, per data reader/writer, (e.g., four) are "too many." The threshold number may be a static, pre-set value, or may be set dynamically.

Figure 8:
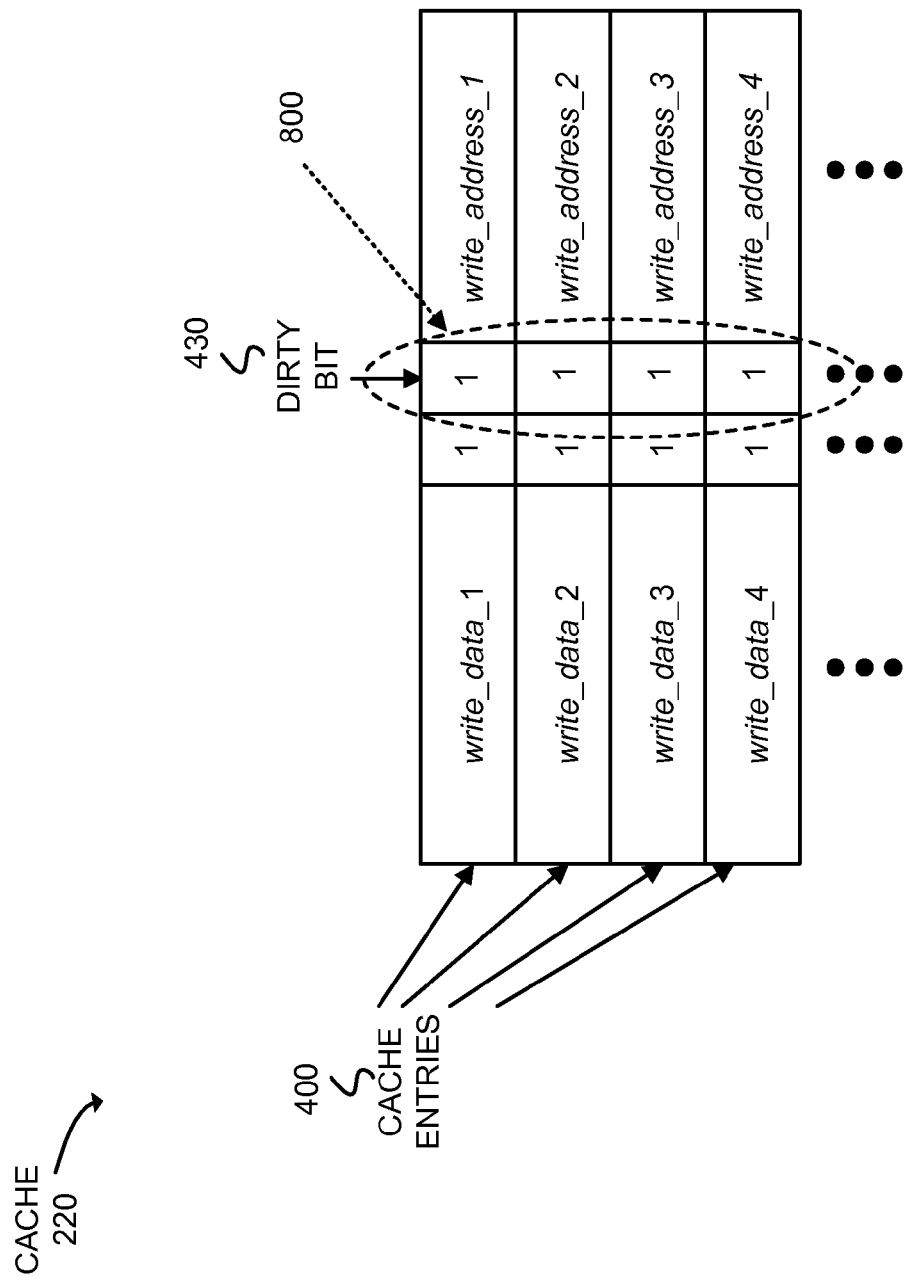
FIG. 8 is a diagram that depicts an example of a situation in which too many dirty entries are stored in the cache memory of FIG. 2.

If there are too many dirty entries in cache memory 220 (block 710—YES), then a blocking notification may be sent to the data reader/writer 110 (block 720). FIG. 8 depicts an example where cache controller 210 has determined that four entries 400 in cache memory 220 have dirty bits 430 set to one (i.e., indicating that they are dirty). In this example, the threshold for "too many dirty entries" is pre-set at four, and, therefore, cache controller 210 may determine that too many dirty entries are contained in cache memory 220. The blocking notification sent by cache controller 210 notifies the data reader/writer (i.e., that has too many dirty entries in cache memory 220) that the data reader/writer may not issue any additional read/write requests to cache controller 210 until cache controller 210 notifies the data reader/writer that the blocking has been discontinued. Read/write requests from the data reader/writer may continue to be blocked until cache memory 200 has few enough dirty entries for the data reader/writer (block 730). Cache controller 210 may monitor the number of dirty entries stored in cache memory 220 for a given data reader/writer and, if the number of dirty entries is reduced to a few enough number (e.g., below a certain threshold number), cache controller 210 may send a notification to the data reader/writer notifying the data reader/writer that it may now send new read/write requests.

Cache controller 210 may determine that a threshold number of dirty entries (e.g., four) are "too many." The threshold number may be a static, pre-set value, or may be set dynamically. FIG. 7 depicts an example where cache controller 210 has determined that four entries 400 in cache memory 220 have dirty bits set to one (i.e., indicating that they are dirty). In this example, the threshold for "too many dirty entries" is pre-set at four, and, therefore, cache controller 210 may determine that too many dirty entries are contained in cache memory 220.

If there are too many dirty entries in cache 220 (block 525—YES), then the writing of data to cache memory 220 may be blocked until the number of dirty entries in cache memory 220 is below the threshold (block 530). While the writing of data to cache memory 220 is blocked, cache controller 210 may permit no further writing of data to, or reading of data from, cache memory 220 and memory 130 until there are few enough dirty entries stored in cache memory 220. Reduction of the number dirty entries in cache memory 220 may occur due to forced or opportunistic writebacks, as described below with respect to blocks 915 and 925 in FIG. 9.

Exemplary Per Cycle Memory Writeback Process

Figure 9:
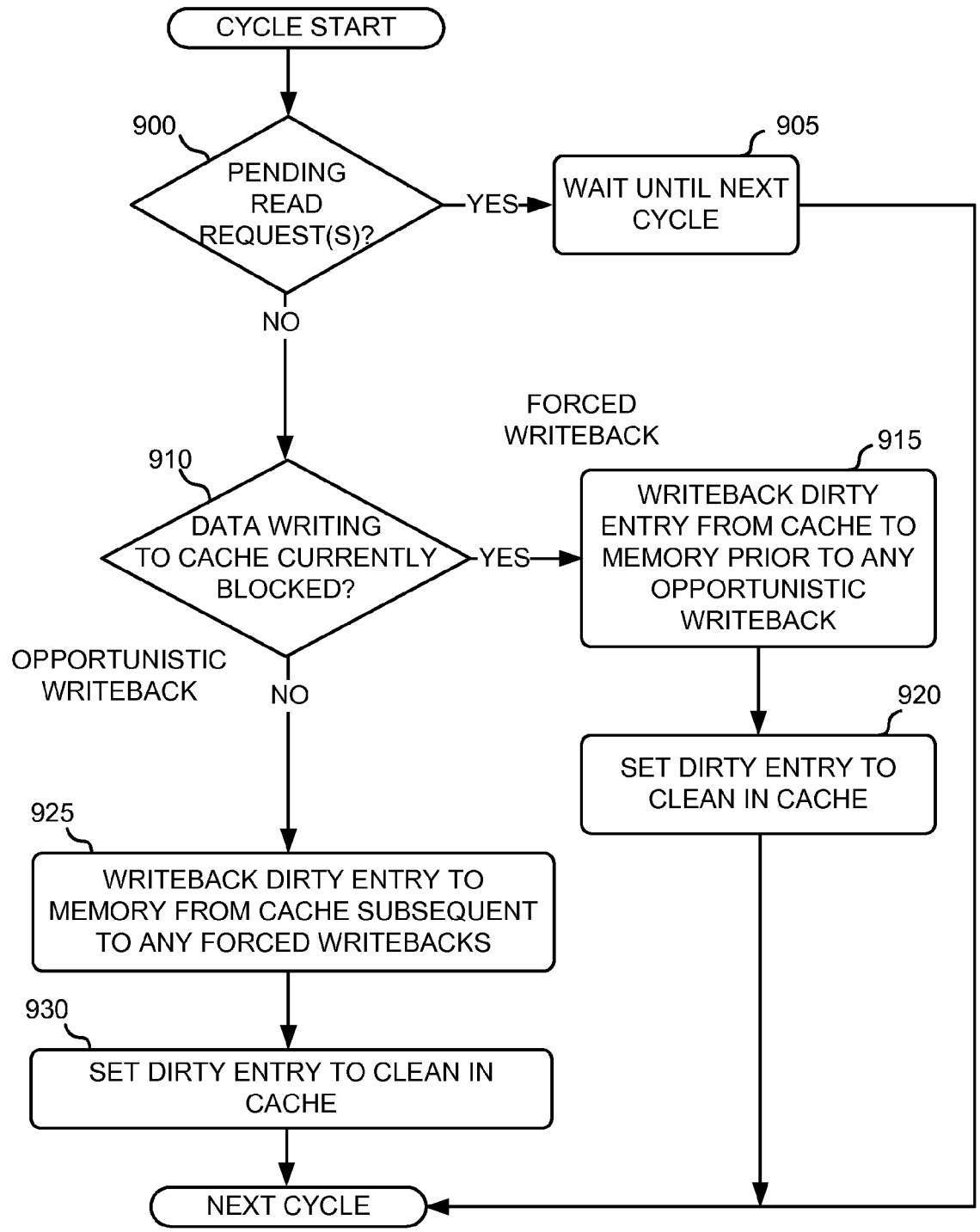
FIG. 9 is a flow chart that illustrates an exemplary process for performing a per-clock cycle writeback of data from the cache memory to the single port memory of FIG. 2.

FIG. 9 is a flow chart that illustrates an exemplary process for performing a per-clock cycle writeback of data from cache memory 220 to memory 130. The exemplary process of FIG. 9 may be performed by cache controller 210. In other embodiments, some or all of the blocks described below may be performed by another component or device, or a combination of components or devices. The exemplary process of FIG. 9 may, for example, be performed during each system clock cycle of system 100.

Subsequent to the start of a system clock cycle, the exemplary process may include determining if there is a pending read request(s) (block 900). Cache controller 210 may receive one or more read requests from data reader/writers 110-1 through 110-N. Since memory 130 is a single port memory, and, therefore, permits only one memory read or write per clock cycle, multiple pending read requests may be queued based on their arrival time at cache controller 210. As described with respect to blocks 510, 515 and 520 of FIG. 5 above, cache controller 210 may determine, for a given read request from data reader/writer 110, that the requested data is not stored in cache memory 220. If the requested data is not stored in cache memory 220, then the read request may be pending to read the data from memory 130. If a read request(s) is pending (block 900—YES), cache controller 210 may wait until the next clock cycle to attempt to perform any data writebacks from cache memory 220 to memory 130 (block 905). Read requests may be performed as described above with respect to blocks 510-520 of FIG. 5, where the data reads are performed prior to any data writes.

Figure 10:
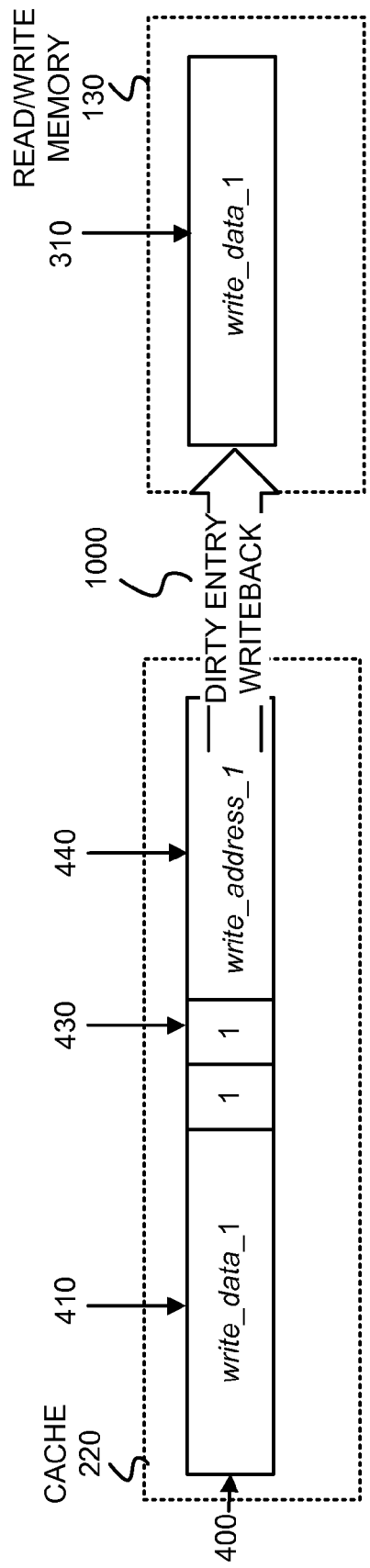
FIG. 10 is a diagram that depicts an example of the writing back of a dirty entry from the cache memory to the single port memory of FIG. 2.

If there is no pending reading request(s) (block 900—NO), then it may be determined whether data writing to cache memory 220 has been blocked (block 910). Data writing to cache 220 may have been blocked due to too many dirty entries being stored in cache memory 220 at the time an attempt was made to write a new data item to cache 220 (see block 530 above). If data writing to cache memory 220 is currently blocked (block 910—YES), then a dirty entry from cache memory 220 may be written back from cache memory 220 to memory 130 prior to any opportunistic writeback (i.e., that occurs in block 925 below) (block 915). The dirty entry from cache memory 220 that is written back from cache memory 220 to memory 130 may be set to clean (block 920). Block 915, thus, may use a "forced writeback" technique in which a dirty entry in cache memory 220 is written back to memory 130, if no data reads are being performed, and prior to any opportunistic writebacks (described with respect to block 925 below). The "forced writeback," therefore, copies data from cache memory 220 to memory at a higher priority than opportunistic writebacks, but at a lower priority than memory reads. Upon the writing back of data from cache memory 220 to memory 130, dirty bit 430 of the written data's entry 400 in cache memory 220 may be set to zero, indicating that the entry is clean (i.e., has been written to memory 130). FIG. 10 depicts an example of the writing back of data from cache memory 220 to memory 130. As shown, entry 400 of cache memory 220 includes a dirty entry (i.e., dirty bit 430 set to one), and is written back 1000 from cache memory 220 to an address of memory 130 that corresponds to the write address contained in read/write address field 440.

If data writing to cache memory 220 is not currently being blocked (block 910—NO), then a dirty entry from cache memory 220 may be written back from cache memory 220 to memory 130 subsequent to any forced writebacks (i.e., that occur in block 915 above). The dirty entry from cache memory 220 that is written back from cache memory 220 to memory 130 may be set to clean (block 930). Block 925 may, thus, use an "opportunistic writeback" technique in which a dirty entry in cache memory 220 is written back to memory 130, if no data reads are being performed, subsequent to any forced writebacks (described with respect to block 915 above). The "opportunistic writeback," therefore, copies data from cache 220 to memory 130 at a lower priority than both forced writebacks and data reads. Upon the writing back of data from cache memory 220 to memory 130, dirty bit 430 of the written data's entry 400 in cache memory 220 may be set to zero, indicating that the entry is clean.

Blocks 900 through 930 may be repeated for each clock cycle of system 100. The exemplary process of FIG. 9 may be executed in parallel with the exemplary process of FIG. 5. Thus, the exemplary process of FIG. 9 may be executed simultaneously with the exemplary process of FIG. 9 by cache controller 210.

Exemplary Cache Flushing Process

Figure 11:
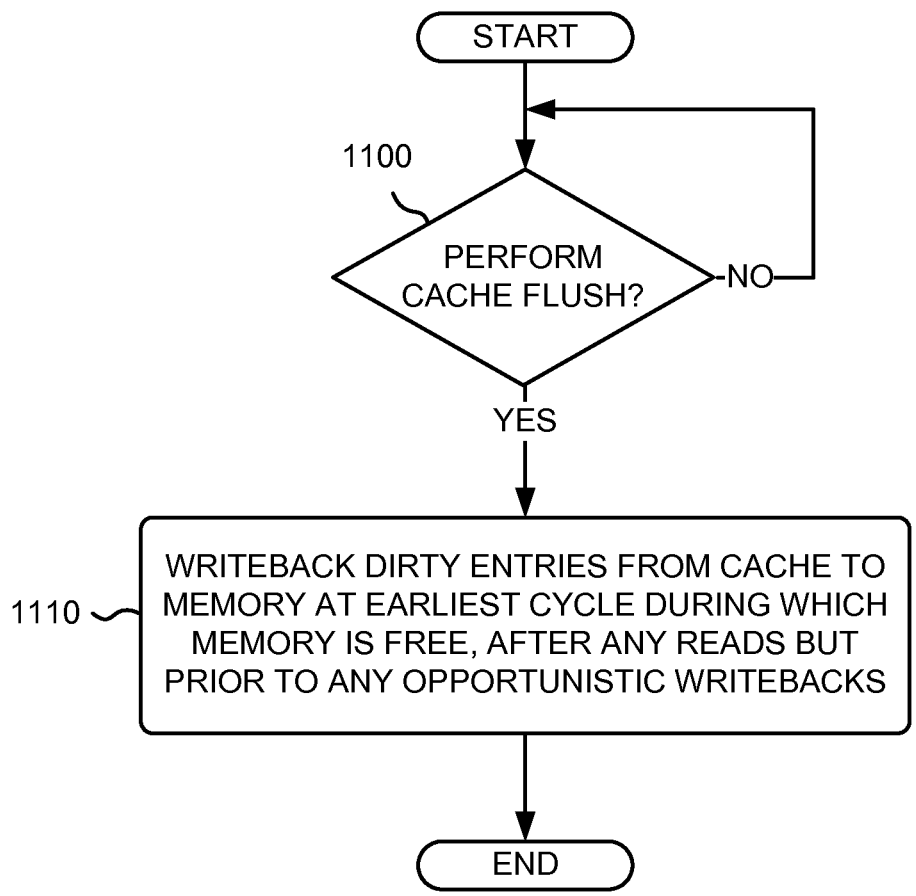
FIG. 11 is a flow chart that illustrates an exemplary process for "flushing" dirty entries from the cache memory of FIG. 2.

FIG. 11 is a flow chart that illustrates an exemplary process for flushing dirty entries from cache 220. The exemplary process of FIG. 11 may be performed by cache controller 210. In other embodiments, some or all of the blocks described below may be performed by another component or device, or a combination of components or devices.

Figure 12:
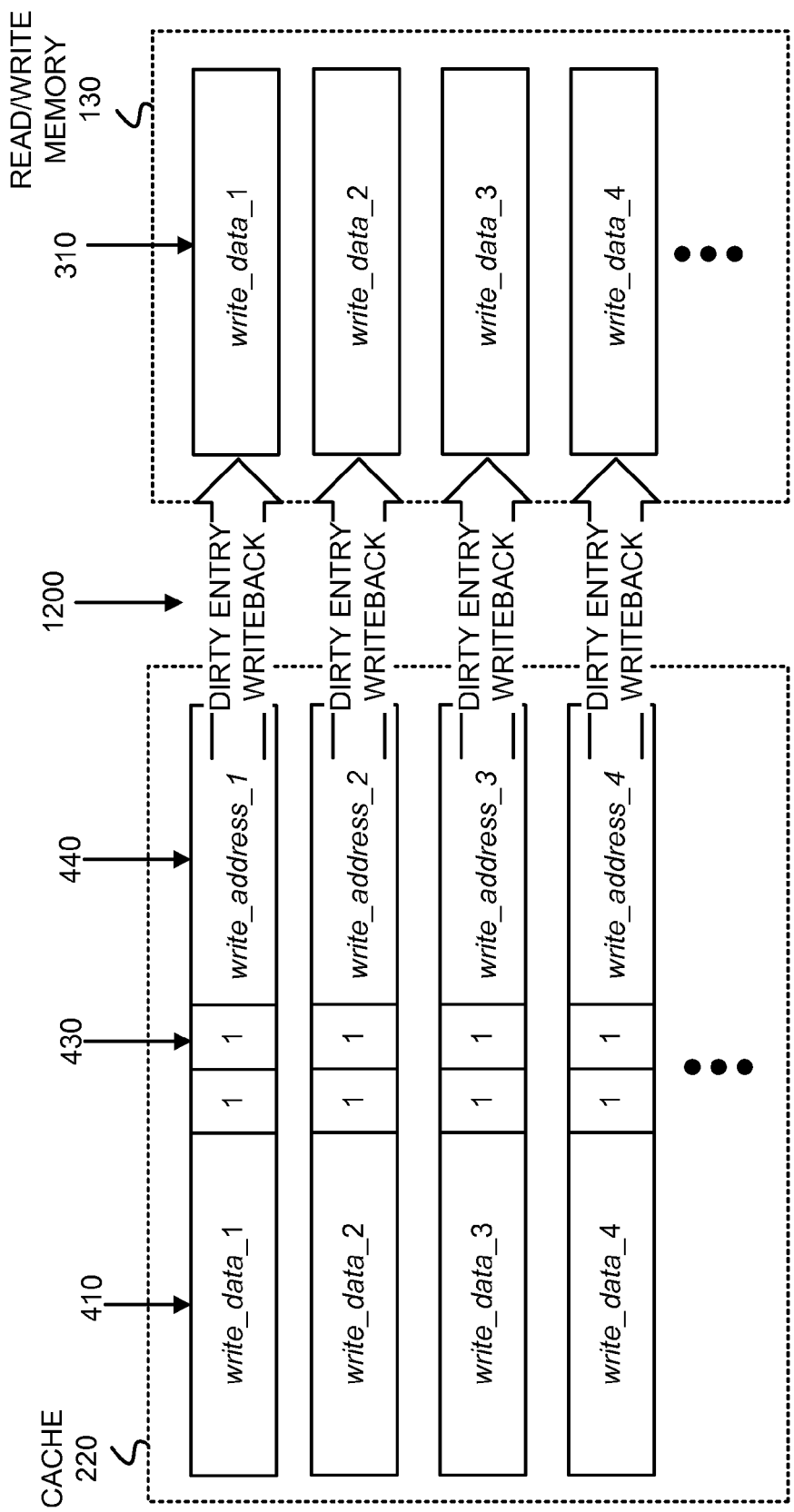
FIG. 12 is a diagram that depicts an example of the exemplary cache flushing process of FIG. 11.

The exemplary process may include determining whether a cache flush should be performed (block 1100). A cache flush may be pre-configured to occur at periodic intervals, or may occur based on dynamic factors (e.g., a number of read and/or write requests received, etc.). In some embodiments, the cache flush may occur upon the execution of a specific instruction. Cache controller 210 may make the determination of whether a cache flush should be performed. If a cache flush is to be performed (block 1100—YES), then dirty entries from cache memory 220 may be written back to memory 130 at an earliest clock cycle during which memory 130 is free, after any pending memory reads, but prior to any opportunistic writebacks. The cache flush process may include writing back all dirty entries stored in cache memory 220 to memory 130. The cache flush write back process, however, may occur only after all pending reads have been performed, but prior to any opportunistic writebacks (described above with respect to block 925 of FIG. 9). The cache flush process, therefore, may result in all dirty entries stored in cache memory 220 being written back to memory 130. Given that memory 130 includes a single port memory, the cache flush process of FIG. 10 may be performed over multiple clock cycles, with one writeback from cache memory 220 to memory 130 occurring for each clock cycle. FIG. 12 depicts an example of cache flushing. As shown in FIG. 12, multiple dirty entries (i.e., having dirty bit 430 set to one) are written back 1200 from cache memory 220 to a respective address of memory 130 that corresponds to the dirty entry's write address contained in read/write address field 440. The cache flushing of FIG. 12 may occur over multiple clock cycles (i.e., at least one clock cycle per dirty entry writeback to memory 130).

The exemplary process of FIG. 11 may be executed in parallel with the exemplary processes of FIGS. 5 and 9. Thus, the exemplary process of FIG. 11 may be executed simultaneously with the exemplary processes of FIGS. 5 and 9 by cache controller 210.

CONCLUSION

As described herein, a separate cache memory may be used in conjunction with reading data from, or writing data to, a single port memory in a memory read/write system. The separate cache memory reduces memory bandwidth pressure by delaying data writes to the single port memory until subsequent clock cycles in which no read requests are pending. Read requests, therefore, are given priority over write requests when accessing the single port memory.

The foregoing description of embodiments described herein provides illustration and description, but is not intended to be exhaustive or to limit the embodiments described herein to the precise form disclosed. Modifications and variations are possible in light of the above teachings or may be acquired from practice of the invention.

While series of blocks have been described in FIGS. 5, 7, 9 and 11, the order of the blocks may vary in other implementations. Also, non-dependent blocks may be performed in parallel. Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

What is claimed:

1. A method comprising:
   receiving, at a controller of a data read/write system, first data to write to an address of a single port memory;
   receiving, at the controller, a request to read second data from the single port memory;
   determining, by the controller, a quantity of entries stored in a cache memory that is separate from the single port memory,
      each of the quantity of entries including a dirty bit field,
         the dirty bit field indicating whether data stored in a data field of an entry, of the quantity of entries, has been written back from the cache memory to the single port memory;
   transmitting, by the controller and when a determined quantity of entries including a dirty bit field indicating that the data stored in the data field has not been written back from the cache memory to the single port memory is greater than a threshold, a blocking notification,
      the blocking notification indicating that write requests will be blocked until the determined quantity is less than the threshold;

writing, by the controller and when the determined quantity is greater than the threshold, an entry, of the quantity of entries, to the single port memory based on a first priority,
   the dirty bit field of the entry indicating that the data stored in the data field of the entry has not been written back from the cache memory to the single port memory;

changing, by the controller and based on writing the entry, a value associated with the dirty bit field of the entry;

storing, by the controller and when the determined quantity is less than the threshold, the first data in the cache memory based on a second priority,
   the second priority being less than the first priority;

retrieving the second data from either the cache memory or the single port memory during a first system clock cycle; and copying the first data from the cache memory and storing the first data at the address in the single port memory during a second system clock cycle that is different than the first system clock cycle.

2. The method of claim 1, where retrieving the second data from either the cache memory or the single port memory comprises:
   determining, by the controller, if the second data is stored in the cache memory;
   retrieving the second data from the cache memory, and not from the single port memory, when the second data is stored in the cache memory; and
   retrieving the second data from the single port memory, and not the cache memory, when the second data is not stored in the cache memory.

3. The method of claim 1, where storing the first data in the memory cache comprises:
   using per-bit write enables to store bits of the first data in the cache memory.

4. The method of claim 1, where the request to read the second data from the single port memory is received from a data reader, the method further comprising:
   determining, for the data reader, a number of items of data stored in the cache memory that have not been copied from the cache memory and stored in the single port memory; and
   sending a blocking notification to the data reader notifying the data reader that future read requests are blocked.

5. The method of claim 4, where the blocking notification is sent if the determined number of items of data is greater than a specified number.

6. A system comprising:
a system clock;
a single port memory;
a cache memory that is separate from the single port memory; and
a controller to:
   receive first data to write to an address of the single port memory;
   receive a request to read second data from the single port memory;
   determine a quantity of entries stored in the cache memory,
      each of the quantity of entries including a dirty bit field,
      the dirty bit field indicating whether data stored in a data field of an entry, of the quantity of entries, has been written back from the cache memory to the single port memory;

transmit, when a determined quantity of entries including a dirty bit field indicating that the data stored in the data field has not been written back from the cache memory to the single port memory is greater than a threshold, a blocking notification,
   the blocking notification indicating that write requests will be blocked until the determined quantity is less than the threshold;

write when the determined quantity is greater than the threshold, an entry, of the quantity of entries, to the single port memory based on a first priority,
   the dirty bit field of the entry indicating that the data stored in the data field of the entry has not been written back from the cache memory to the single port memory;

change, based on writing the entry, a value associated with the dirty bit field of the entry;

store, when the determined quantity is less than the threshold, the first data in the cache memory based on a second priority,
   the second priority being less than the first priority;

retrieve the second data from either the cache memory or the single port memory during a first clock cycle of the system clock; and copy the first data from the cache memory and store the first data at the address in the single port memory during a second clock cycle of the system clock that is different than the first clock cycle.

7. The system of claim 6, where, when retrieving the second data from either the cache memory or the single port memory, the controller is further to:
   determine if the second data is stored in the cache memory,
   retrieve the second data from the cache memory, and not from the single port memory, when the second data is stored in the cache memory, and
   retrieve the second data from the single port memory when the second data is not stored in the cache memory.

8. The system of claim 6, where, when storing the first data in the memory cache, the controller is further to:
   use per-bit write enables to store bits of the first data in the cache memory.

9. The system of claim 6, where the request to read the second data from the single port memory is received from a data reader and where the controller is further to:
   determine, for the data reader, a number of items of data stored in the cache memory that have not been copied from the cache memory and stored in the single port memory, and
   send a blocking notification to the data reader notifying the data reader that future read requests are blocked.

10. The system of claim 9, where the blocking notification is sent when the determined number of items of data is greater than a specified number.

11. A method comprising:
receiving, by at least one controller, read requests for reading data from a single port memory;
receiving, by the at least one controller, write requests for writing data to the single port memory;
determining, by the at least one controller, a quantity of entries stored in a cache memory that is external to the single port memory,
   each of the quantity of entries including a dirty bit field,
      the dirty bit field indicating whether data stored in a data field of an entry, of the quantity of entries, has been written back from the cache memory to the single port memory;

transmitting, by the at least one controller and when a determined quantity of entries including a dirty bit field indicating that the data stored in the data field has not been written back from the cache memory to the single port memory is greater than a threshold, a blocking notification,
  the blocking notification indicating that write requests will be blocked until the determined quantity is less than the threshold;
writing, by the at least one controller and when the determined quantity is greater than the threshold, an entry, of the quantity of entries, to the single port memory based on a first priority,
  the dirty bit field of the entry indicating that the data stored in the data field of the entry has not been written back from the cache memory to the single port memory;
changing, by the at least one controller and based on writing the entry, a value associated with the dirty bit field of the entry;
storing, by the at least one controller and when the determined quantity is less than the threshold, data associated with the write requests to the cache memory based on a second priority,
  the second priority being less than the first priority;
assigning, by the at least one controller, a third priority to at least a portion of the read requests and a fourth priority to the write requests,
  the first priority being greater than the fourth priority; and
accessing, by the at least one controller, the single port memory to read the first data from the single port memory, or to write the second data from storage in the cache memory to the single port memory, based on the assigned third priority and fourth priority.

12. The method of claim 11, further comprising:
determining whether the data requested in the read requests is stored in the cache memory, and
where the at least a portion of the read requests comprise the read requests including requested data that is not stored in the cache memory.

13. The method of claim 11, where accessing the single port memory based on the assigned third priority and the assigned fourth priority comprises:
accessing the single port memory to read the first data from the single port memory prior to accessing the single port memory to write the second data from storage in the cache memory to the single port memory.

14. The method of claim 11, where
accessing the single port memory to read the first data from the single port memory occurs during one or more first clock cycles, and
accessing the single port memory to write the second data from storage in the cache to the single port memory occurs during one or more second clock cycles that are subsequent to the one or more first clock cycles.

15. A system comprising:
a single port memory;
a cache memory that is separate from the single port memory; and
a controller to:
  receive read requests for reading first data from the single port memory;
  receive write requests for writing second data to the single port memory;
  determine a quantity of entries stored in the cache memory,
    each of the quantity of entries being associated with a dirty bit field,
      the dirty bit field indicating whether data stored in a data field of an entry, of the quantity of entries, has been written back from the cache memory to the single port memory;
  transmit, when a determined quantity of entries including a dirty bit field indicating that the data stored in the data field has not been written back from the cache memory to the single port memory is greater than a threshold, a blocking notification,
    the blocking notification indicating that write requests will be blocked until the determined quantity is less than the threshold;
  write when the determined quantity is greater than the threshold, an entry, of the quantity of entries, to the single port memory based on a first priority,
    the dirty bit field of the entry indicating that the data stored in the data field of the entry has not been written back from the cache memory to the single port memory;
  change, based on writing the entry, a value associated with the dirty bit field of the entry;
  store, when the determined quantity is less than the threshold, the second data associated with the write requests to the cache memory based on a second priority,
    the second priority being less than the first priority; and
  assign a priority to the read requests over the write requests when accessing the single port memory to read the first data from the single port memory or write the second data from the cache memory to the single port memory.

16. The system of claim 15, where, when accessing the single port memory, the cache controller is further to:
access the single port memory to read the first data from the single port memory prior to accessing the single port memory to write the second data from the cache memory to the single port memory.

17. The system of claim 15, where accessing the single port memory to read the first data from the single port memory occurs during first clock cycles, and where accessing the single port memory to write the second data from the memory cache to the single port memory occurs during second clock cycles that are subsequent to the first clock cycles.

18. A method comprising:
receiving, by a controller, data to store at an address of a single port memory;
determining, by the controller, a quantity of entries stored in a cache memory that is separate from the single port memory;
transmitting, by the controller and when the determined quantity of entries is greater than a threshold, a blocking notification,
  the blocking notification indicating that write requests will be blocked until the determined quantity is less than the threshold;
writing, by the controller and when the determined quantity is greater than the threshold, an entry, of the quantity of entries, to the single port memory based on a first priority,
changing, by the controller and based on writing the entry, a value associated with a bit field of the entry;
storing, by the controller and when the determined quantity is less than the threshold, the data, at a first system clock cycle, in the cache memory based on a second priority, the second priority being less than the first priority;
copying the data from the cache memory, at a second system clock cycle;
storing the data at the address in the single port memory;
receiving, at the controller, a request to read the data from the single port memory;
determining, by the controller, if the data remains stored in the cache memory;
retrieving the data from the cache memory, and not from the single port memory, if the data remains stored in the cache memory;
retrieving the data from the address in the single port memory if the data is no longer stored in the cache memory; and
returning the retrieved data based on the request to read the data.

19. The method of claim 18, where the second system clock cycle is subsequent to the first system clock cycle.

20. A system comprising:
a single port memory;
a cache memory that is separate from the single port memory; and
at least one controller to:
receive data to store at an address of the single port memory;
determine a quantity of entries stored in the cache memory;
transmit, when the determined quantity of entries is greater than a threshold, a blocking notification, the blocking notification indicating that write requests will be blocked until the determined quantity is less than the threshold;
write when the determined quantity is greater than the threshold, an entry, of the quantity of entries, to the single port memory based on a first priority;
change, based on writing the entry, a value associated with a bit field of the entry;
store, when the determined quantity is less than the threshold, the data, at a first system clock cycle, in the cache memory based on a second priority,
the second priority being less than the first priority;
copy the data from the cache memory at a second system clock cycle, the second system clock cycle being subsequent to the first system clock cycle;
store the data at the address in the single port memory;
receive a request to read the data from the single port memory;
determine if the data remains stored in the cache memory;
retrieve the data from the cache memory, and not from the single port memory, if the data remains stored in the cache memory; and
retrieve the data from the address in the single port memory if the data is no longer stored in the cache memory.

* * * * *